Nov. 9, 1926.
L. H. BLOOD
BELL RINGER
Filed Sept. 6, 1924
1,606,464
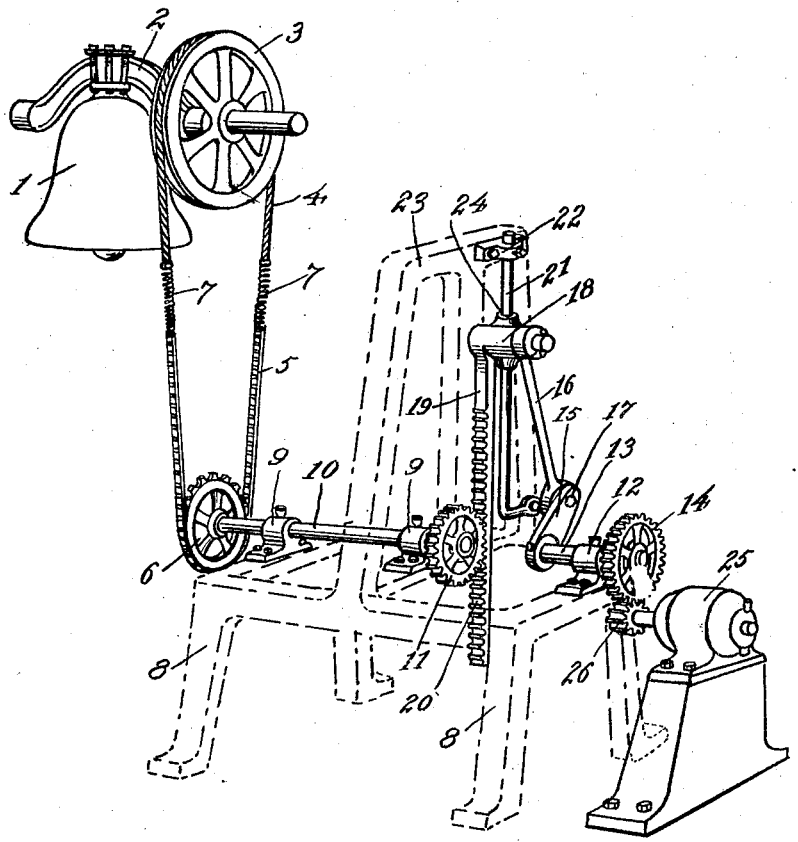
INVENTOR:
Louis H. Blood
BY Allen & Allen
ATTORNEYS.

Patented Nov. 9, 1926.

1,606,464

UNITED STATES PATENT OFFICE.

LOUIS H. BLOOD, OF CINCINNATI, OHIO, ASSIGNOR TO THE E. W. VANDUZEN COMPANY, OF CINCINNATI, OHIO, A CORPORATION OF OHIO.

BELL RINGER.

Application filed September 6, 1924. Serial No. 736,261.

My invention relates to a bell ringing mechanism which can be actuated either manually or by motor power or other power devices and is applicable to bells of any dimensions and more especially such where the bell is swung by means of a rope passing over a channeled bell wheel or by means of a bell crank with an end of rope fastened to each arm thereof.

The object of my invention is to provide a cheap labor saving mechanism of practical use especially for bells of large dimensions, where one or more men are required to operate the bell pulls, and where manual means now in use are not always satisfactory in maintaining equal rythmic strokes especially when operated by inexperienced persons.

I attain these objects in that certain construction hereinafter more fully described and illustrated in the accompanying drawing in which the figure is a perspective view of my improved mechanism.

The bell is shown at 1, hung on a suitable bell yoke, on one end of which is keyed a grooved pulley 3. Over this pulley 3 the bell rope 4 is passed, the ends of which are provided with coiled springs 7, 7, by which the rope is attached to the ends of a chain 5, the links of which are in mesh with the sprocket wheel 6, or a drum with a rope can be used instead of the sprocket drive.

Upon a frame 8 I have mounted bearings 9—9 and have journaled a shaft 10 therein. One end of this shaft bears the sprocket wheel 6 keyed thereto and the other end has a spur wheel 11 keyed upon it.

A bearing 12 is mounted in horizontal alignment with the bearings 9 upon another part of the frame 8, and the shaft 13 is journaled in this bearing. Thus the shafts 10 and 13 are placed in end to end alignment with each other.

The spur gear 14 is keyed to the outer end of the shaft 13 and a crank 15 is keyed to its inner end so as to rotate in a parallel plane with the spur gear 11. A connecting rod 16 is journaled at one end to the free end of the crank by means of the crank pin 17, and the other end is journaled upon a crank block 18 fashioned out of one end and at right angles to the rack bar 19. The rack bar has teeth 20 which mesh with the teeth in the spur gear 11.

A guide bar 21 is secured by means of the bracket 22 at its upper end to an extension 23 on the frame and passing through a suitable bearing 24 in the crank block 18 is secured at its lower end to another part of the frame, thus forming a guideway to hold the rack in position and in mesh with the spur gear 11.

In the preferred construction shown in the drawing, power is provided by an electric motor 25 with a pinion 26 keyed to the armature shaft thereof, this pinion being in mesh with the spur gear 14. But I wish it to be understood that the above mentioned motor is not a necessary source of power. Power may be supplied by other power machinery and transmitted by means of a belt and pulley or the device may also be operated manually by means of a crank, and crank shaft with the pinion 26 keyed thereto.

In practical operation rotary movement imparted to the spur wheel 14, is transmitted through the shaft 13 to the crank 15 which in rotating imparts reciprocating movement to the rack 19 through the connecting rod 16.

The rack being in mesh with the spur gear 11, in reciprocating imparts rotary movement to this gear which may be a fraction of a revolution or several revolutions according to the amount of movement of the rack and the size of the gear and number of teeth thereon. The amount of movement of the rack is dependent upon the amount of throw imparted by the crank 15 and the relative travel of the rack and the spur gear 11 may be determined thereby.

It will be readily understood that the reciprocating movement of the rack causes the spur gear to rotate first in one direction and then in reverse and in transmitting this movement to the sprocket wheel 6 and thence by means of the chain 5 and rope 4 to the bell pulley 3 the latter is rocked and the ringing of the bell is accomplished.

It will also be evident that the crank movement will impart a variable speed to the rack, thus obtaining the proper slow movement at the commencement of the stroke, increasing for the full swing and decreasing on the turns.

Where very large bells are concerned, my device may be so connected as to rock the clapper instead of the bell by attaching the rope to the two arms of a bell crank mounted in connection with the clapper of the bell.

Furthermore by the use of time switches or other devices of like character for turning on and off the power used in operating my device, the period of duration of the ringing of a bell may be determined automatically.

The springs 7 which transmit the movement of the chain 5 to the bell pulley play quite an important part in the mechanism.

In the ringing of a bell, the bell should swing a full one hundred and eighty degrees, practically from one horizontal position to the other and without a resilient connection between the chain and the rope; it would require much more powerful and cumbersome mechanism to accomplish this in starting from the position of rest.

With the springs interposed between the ends of the pulling rope 4 and the chain 5, as the chain is actuated first in one direction and then in the other, with a movement equal to one half the circumference of the bell pulley, the spring on the side which pulls down first will expand when the bell has swung up about sixty degrees and will hold the bell in that position until the movement of the chain is reversed. When the bell swings up on the opposite side the momentum of the bell in conjunction with the pull of the actuating mechanism, through the spring will carry the bell above the sixty degree point. At each movement of the chain the swing of the bell will increase until it will swing the full one hundred and eighty degrees.

Having thus described my invention, what I claim as new and desire to secure by Letters Patent, is:—

1. In a mechanical bell ringer, a centrally pivoted bell, with a bell rope for swinging the same from side to side, means for transmitting a variable speed swinging movement thereto, comprising a spur gear and means for driving same, a crank connected therewith, carrying a rack, a spur gear in mesh with said rack and rotated thereby, a sprocket wheel connected with said spur gear with a chain and belt element in mesh with said sprocket wheel, and springs interposed between the rope and chain to overcome the inertia of the bell.

2. In a mechanical bell ringing machine, a train of reduction gears operatively connected with a rotatable driving member, a crank element operatively connected with said train of gears, a rack and pinion operatively connected with said crank element, with interconnecting mechanism between the pinion and a bell to be actuated, whereby periodic actuation of the bell will be timed with the periodic oscillation of the rack.

3. A mechanical bell ringing device comprising in combination with a rotatable gear, a shaft on which said gear is mounted, a crank mounted on said shaft, a rider element on a slide, a rack connected with the rider element, a pinion with which said rack engages, a shaft on which said pinion is mounted, a driving gear mounted on said last named shaft and a chain engaging said driving gear and means connected with said chain at each end thereof adapted to provide resilient oscillatory movement to both sides of the periphery of a bell wheel.

4. In a mechanical bell ringing mechanism, a bell, means for periodically sounding the bell, a driving member, a crank operatively connected with said driving member, and a rack and pinion interconnecting said crank, and said first mentioned means, said first mentioned means being timed to a periodic oscillation equivalent to the periodic reciprocation of said rack.

LOUIS H. BLOOD.